United States Patent [19]

Kobayashi

[11] Patent Number: 4,973,346
[45] Date of Patent: Nov. 27, 1990

[54] GLASSMELTING METHOD WITH REDUCED NOX GENERATION

[75] Inventor: Hisashi Kobayashi, Putnam Valley, N.Y.

[73] Assignee: Union Carbide Corporation, Danbury, Conn.

[21] Appl. No.: 428,891

[22] Filed: Oct. 30, 1989

[51] Int. Cl.⁵ ............................................. C03B 5/235
[52] U.S. Cl. ........................................ 65/135; 65/335; 65/337
[58] Field of Search ................... 65/135, 134, 335, 337

[56] References Cited

U.S. PATENT DOCUMENTS

| | | | |
|---|---|---|---|
| 3,443,921 | 5/1969 | Boivent | 65/134 |
| 3,508,742 | 4/1970 | Minegishi | 263/32 |
| 4,061,487 | 12/1977 | Kiyonaga | 65/135 |
| 4,099,953 | 7/1978 | Rondeaux et al. | 65/335 |
| 4,135,904 | 1/1979 | Suzuki et al. | 65/27 |
| 4,184,861 | 1/1980 | Erickson et al. | 65/27 |
| 4,185,984 | 1/1980 | Kiyonaga | 65/135 |
| 4,212,613 | 7/1980 | Seng | 425/141 |
| 4,235,618 | 11/1980 | Henry et al. | 65/21 |
| 4,285,718 | 8/1981 | Mathias et al. | 65/134 |
| 4,303,434 | 12/1981 | Rough, Sr. et al. | 65/27 |
| 4,306,899 | 12/1981 | Richards | 65/134 |
| 4,310,342 | 1/1982 | Richards | 65/27 |
| 4,330,315 | 5/1982 | Nelson et al. | 65/27 |
| 4,374,660 | 2/1983 | Sakhuja et al. | 65/335 |
| 4,381,934 | 5/1983 | Kunkle et al. | 65/135 |
| 4,473,388 | 9/1984 | Lauwers | 65/134 |
| 4,492,594 | 1/1985 | Curley | 65/134 |
| 4,496,387 | 1/1985 | Heithoff et al. | 65/335 |
| 4,519,814 | 5/1985 | Demarest, Jr. | 65/27 |
| 4,529,428 | 7/1985 | Groetzinger | 65/27 |
| 4,539,030 | 9/1985 | Demarest et al. | 65/135 x |
| 4,545,798 | 10/1985 | Matesa | 65/27 |
| 4,599,100 | 7/1986 | Demarest | 65/134 |
| 4,604,121 | 8/1986 | Demarest et al. | 65/135 X |
| 4,617,046 | 10/1986 | Hals | 65/134 |
| 4,632,687 | 12/1986 | Kunkle et al. | 65/134 X |
| 4,816,056 | 3/1989 | Tsai et al. | 65/135 |

FOREIGN PATENT DOCUMENTS

895293 5/1962 United Kingdom.
1135285 12/1968 United Kingdom.
1173777 12/1969 United Kingdom.

Primary Examiner—Robert L. Lindsay
Attorney, Agent, or Firm—Stanley Ktorides

[57] ABSTRACT

A glassmelting method wherein glassforming materials are preheated prior to entering the melting vessel by direct contact with combustion products from the melting vessel produced by combustion carried out with pure oxygen or oxygen-enriched air.

12 Claims, 1 Drawing Sheet

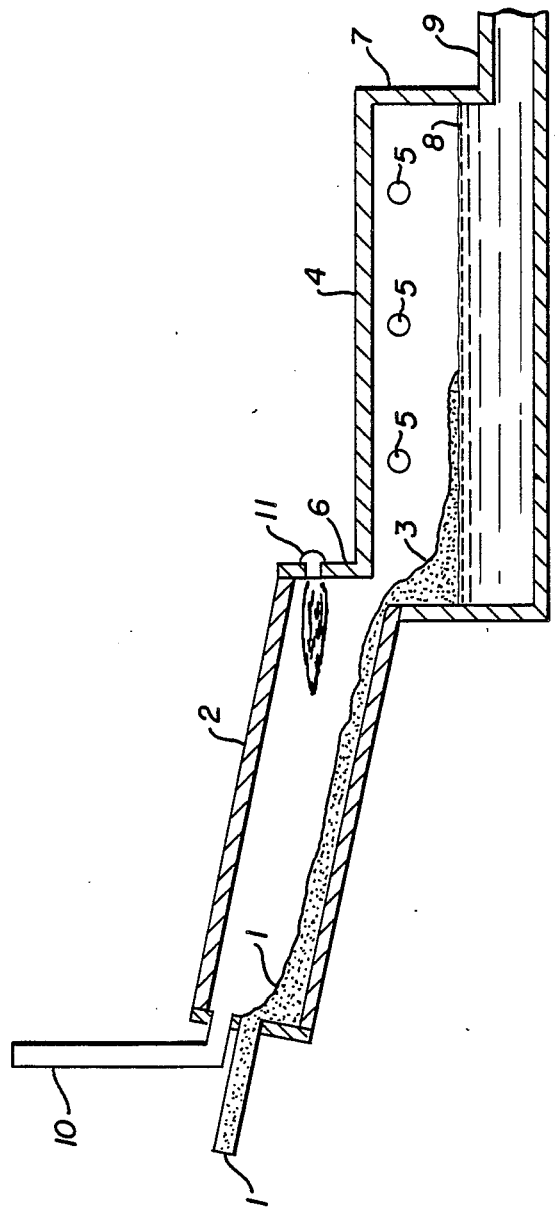

GLASSMELTING METHOD WITH REDUCED NOX GENERATION

TECHNICAL FIELD

This invention relates generally to the field of glassmaking and more particularly to the step in the glassmaking process wherein glass forming materials are melted.

BACKGROUND ART

A conventional glassmelting furnace employs air-fired burners to melt the glass forming materials. Because of the very high temperatures required to melt the glass forming materials, a glassmelting furnace operates at temperatures which are among the highest of all industrial furnaces. These high operating temperatures cause a large amount of the heat produced by the burners to be lost up the flue. Typically only about 15 to 20 percent of the energy produced by the burners is available to the glassmelting furnace as useful heat when the burners are fired with ambient air and natural gas.

Those skilled in the art have addressed this problem by passing the flue gases from the glassmelting furnace in indirect heat exchange with incoming air to preheat the air and thus transfer heat, which otherwise would have escaped up the flue, back to the glassmelting furnace. These heat exchangers, known in the art as regenerators, significantly raise the efficiency of commercial air-fired glassmelting furnaces.

Nitrogen oxides, known as $NO_x$, are considered to be detrimental environmental pollutants and the reduction of $NO_x$ emissions is an increasingly important goal. The conventional air-fired glassmelting process is a significant generator of $NO_x$ for two reasons. First, nearly 80 percent of air is nitrogen thus bringing significant amounts of nitrogen into the combustion process for the formation of $NO_x$. Second, the high temperatures required for the glassmelting operation kinetically favor the formation of $NO_x$.

It is known that the thermal efficiency of the glassmelting step can be increased by the use of oxygen or oxygen-enriched air as the oxidant. Moreover, the use of oxygen or oxygen-enriched air reduces the amount of nitrogen which is present in the combustion zone. However, the substitution of oxygen or oxygen-enriched air in place of air will cause the combustion reaction to proceed at a higher temperature which kinetically favors the formation of $NO_x$. In addition, the cost of oxygen often makes glassmelting using oxygen as the oxidant more expensive than a conventional system using air as the oxidant, despite the increased thermal efficiency attainable with oxygen.

Accordingly, it is an object of this invention to provide a glassmelting method having high efficiency while achieving reduced $NO_x$ generation.

SUMMARY OF THE INVENTION

The above and other objects which will become apparent to one skilled in the art are attained by the present invention which is:

A method for melting glass forming materials comprising:

(A) heating glass forming materials in a Preheating vessel;

(B) passing heated glass forming materials from the preheating vessel into a melting vessel;

(C) combusting fuel and oxidant having an oxygen concentration of at least 30 percent, at a peak flame temperature less than 4000° F, to produce hot combustion products and to provide heat to the melting vessel to melt the heated glass forming materials;

(D) passing hot combustion products from the melting vessel into the preheating vessel to carry out the heating of step (A); and (E) discharging combustion products from the preheating vessel.

As used herein the term "peak flame temperature" means the highest local gas temperature in the flame region.

BRIEF DESCRIPTION OF THE DRAWING

The sole Figure is a cross-sectional view of one preferred embodiment of the present invention.

DETAILED DESCRIPTION

The invention will be described in detail with reference to the Drawing. Referring now to the Figure, glass forming materials 1 are provided into preheating vessel or zone 2. Glass forming materials typically include one or more materials such as sand, soda ash, limestone, dolomite, rouge, and cullet or scrap glass. In one preferred embodiment of the invention the glass forming materials provided into the preheating zone comprise only materials, such as sand, having a sintering temperature greater than 2000° F. The other glass forming materials are provided directly to the melting vessel. In this way sintering of materials in the preheating vessel is prevented.

In the preheating vessel the glass forming materials are heated to a temperature of at least 500° F. and are generally heated to a temperature within the range of from 700° to 2000° F. The heated glass forming materials 3 are then passed into melting vessel or zone 4 which is equipped with one or more burners which use technically pure oxygen having an oxygen concentration of at least 99.5 percent, oxidant containing less than 10 percent nitrogen, or oxygen-enriched air having an oxygen concentration of at least 30 percent as the oxidant. Technically pure oxygen is the preferred oxidant because when technically pure oxygen is used as the oxidant there is substantially no nitrogen brought with the oxidant into the glassmelting vessel during the combustion which can form $NO_x$. However, even with technically pure oxygen some nitrogen from infiltrating air will be present in the combustion zone. In the embodiment illustrated in the Figure, three such burners 5 are shown placed approximately equispaced along the length of melting vessel 4 from its charging end 6 to its discharging end 7. A preferred burner is the burner known in the art as the "A" Burner which is described and claimed in U.S. Pat. No. 4,378,205-Anderson and U.S. Pat. No. 4,541,796-Anderson. Burners 5 may use any suitable fuel among which one can name natural gas, propane, light oils and heavy oils.

The fuel and oxidant is combusted at a peak flame temperature less than 4000° F. and generally within the range of from 3000° to 3800° F. The peak flame temperature may be maintained lower than the adiabatic flame temperature and less than 4000° F. by a number of methods. For example, furnace gas including combustion reaction products may be aspirated into the flame region. Flue gases may be recycled and mixed with oxidant. Yet another method employs fuel-rich combustion. Two or more temperature limiting methods may be employed simultaneously. The preferred peak flame temperature limiting method is the aspiration of furnace gases into the flame region.

The use of oxygen or oxygen-enriched air reduces the amount of nitrogen present which can form $NO_x$ and the low peak flame temperature reduces the kinetic driving force toward $NO_x$ formation.

The combustion in the melting vessel provides heat to melt the heated glass forming materials and the molten materials 8 pass out of the melting vessel through exit 9 for further processing. The combustion also produces hot combustion products within the melting vessel. These hot combustion products typically include water vapor, carbon dioxide, oxygen and nitrogen.

The hot combustion products are passed from melting vessel 4 into preheating vessel 2 to carry out the aforedescribed heating of the glass forming materials by direct contact with the glass forming materials. Although the Figure illustrates a rotary kiln as preheating vessel 2, any other suitable preheating vessel, such as a moving belt furnace, a particulate suspension heating furnace, a moving bed heat exchanger, and a fluidized bed heating furnace, may be used. A connecting passage between preheating vessel 2 and melting vessel 4 enables the feeding of preheated glass forming materials into the melting vessel from the preheating vessel. Moreover it is Preferred that there be a physical barrier within the connecting passage to limit the direct radiative heat exchange between the melting vessel and the preheating vessel. Hot combustion products are passed from melting vessel 4 into preheating vessel 2, preferably through the connecting passage in countercurrent flow with the preheated glass forming materials, and thus in direct contact with the preheated glass forming materials flowing from preheating vessel 2 to melting vessel 4.

The Figure illustrates a particularly preferred embodiment of the invention wherein separate burner 11 is used to combust fuel and air to provide additional combustion products into preheating vessel 2 to assist in the carrying out of the heating of the glass forming materials. Burner 11 may use any of the fuels described for use with burners 5 and, as mentioned, employs air as the oxidant. Since the preheating vessel operates at a temperature substantially below that of the melting vessel, and since the flue gas temperature leaving the preheating vessel is generally less than 1500° F., air may be advantageously employed here as the oxidant thus reducing the overall oxygen requirement.

The combustion products are discharged from preheating vessel 2 through discharge flue 10, generally at a temperature less than 1500° F., preferably at a temperature less than 1000° F., and having low $NO_x$ emissions. $NO_x$ emissions of as little as 0.1 lb. $NO_x$ or less per million BTU fired is attainable by use of the method of this invention.

The following Examples are provided for illustrative purposes and are not intended to be limiting.

EXAMPLE 1

A batch of glass forming materials at a temperature of 70° F. is charged into a preheating vessel which is connected to a melting vessel in an arrangement similar to that illustrated in the Figure except that burner 9 is not employed. "A" Burners are used with the melting vessel. The batch is heated to 800° F. by contact with hot combustion products from the melting vessel which are produced by the combustion of natural gas with technically pure oxygen at a peak flame temperature of 3500° F. The heated batch is passed into the melting vessel wherein it is melted. There is required 3.0 million BTU of fuel per ton of glass to carry out the melting in the melting vessel. The combustion products are discharged from the preheating vessel at a temperature of about 1000° F. $NO_x$ emissions from the process are less than 0.3 lb. of $NO_x$ per ton of glass forming materials melted. In contrast, a conventional air-fired glassmelting furnace using regenerators requires about 5.0 million BTU of fuel per ton of glass forming materials melted and produces from 5 to 15 lbs. of $NO_x$ per ton of glass forming materials melted. Accordingly, the invention enables a greater than 90 percent reduction in $NO_x$ emissions while improving thermal efficiency over that attainable with a conventional air-fired system.

EXAMPLE 2

A procedure similar to that described in Example 1 is carried out except that a burner combusting air and natural gas is positioned to provide additional combustion products to the preheating vessel for further heating of the batch. In this Example 2 the batch is heated to a temperature of 1500° F. There is required 2.3 million BTU of fuel per ton of glass to carry out the melting in the melting vessel and 0.83 million BTU of fuel per ton of glass to carry out the preheating in the preheating vessel, while requiring less oxygen than is required in Example 1. The combustion products are discharged from the preheating vessel at a temperature of about 1000° F. and having $NO_x$ emissions of less than 0.3 lb. per ton of glass forming materials melted.

COMPARATIVE EXAMPLE

For comparative purposes a batch similar to those used in Examples 1 and 2 is melted without preheating. The melting is carried out by combustion with technically pure oxygen and natural gas at a peak flame temperature of 3500° F. There is required 3.7 million BTU per ton of glass to carry out the melting in the melting vessel and the combustion products are discharged from the melting vessel at a temperature of about 2900° F. and having $NO_x$ emissions of about 0.37 lb. per ton of glass forming materials melted.

Now by the use of the method of this invention one can carry out glassmelting at high efficiency and with reduced $NO_x$ generation. Although the invention has been described in detail with reference to certain embodiments, it will be appreciated by those skilled in the art that there are other embodiments of the invention within the spirit and scope of the claims.

What is claimed is:

1. A method for melting glass forming materials comprising:
   (A) heating glass forming materials in a preheating vessel;
   (B) passing heated glass forming materials from the preheating vessel into a melting vessel;
   (C) combusting fuel and oxidant having an oxygen concentration of at least 30 percent, at a peak flame temperature less than 4000° F., to produce hot combustion products and to provide heat to the melting vessel to melt the heated glass forming materials, wherein the peak flame temperature is maintained below 4000° F. by aspiration of combustion products into the flame region;

(D) passing hot combustion products from the melting vessel into the preheating vessel to carry out the heating of step (A); and (E) discharging combustion products from the preheating vessel.

2. The method of claim 1 wherein the glass forming materials are heated in the preheating vessel to a temperature of at least 500° F.

3. The method of claim 1 wherein the combustion of step (C) is carried out with technically pure oxygen as the oxidant.

4. The method of claim 1 further comprising combusting fuel and air to provide additional combustion products into the preheating vessel for the carrying out of the heating of step (A).

5. The method of claim 1 wherein the combustion products are discharged from the preheating vessel at temperature less than 1500° F.

6. The method of claim 1 wherein the peak flame temperature of the combustion of step (C) is within the range of from 3000° to 3800° F.

7. The method of claim 1 wherein the glass forming materials include scrap glass.

8. The method of claim 1 further comprising maintaining the peak flame temperature below 4000° F. by carrying out the combustion of fuel and oxidant in a fuel-rich condition.

9. The method of claim 1 wherein hot combustion products are passed from the melting vessel into the preheating vessel in countercurrent flow with the heated glass forming materials passing from the preheating vessel into the melting vessel.

10. The method of claim 1 wherein the glass forming materials comprise only materials having a sintering temperature greater than 2000° F.

11. The method of claim 1 wherein the oxidant comprises less than 10 percent nitrogen.

12. The method of claim 1 further comprising maintaining the peak flame temperature below 4000° F. by recycling flue gases into the oxidant.

* * * * *